(12) United States Patent
Morehead et al.

(10) Patent No.: US 10,445,398 B2
(45) Date of Patent: Oct. 15, 2019

(54) ASSET MANAGEMENT DURING PRODUCTION OF MEDIA

(71) Applicants: SONY CORPORATION, Tokyo (JP); SONY PICTURES TECHNOLOGIES INC., Culver City, CA (US)

(72) Inventors: Dave Morehead, Los Angeles, CA (US); Yiotis Katsambas, Encino, CA (US); James Williams, Thousand Oaks, CA (US); Rob Skiena, Toronto (CA); Umberto Lazzari, Los Angeles, CA (US)

(73) Assignees: SONY CORPORATION, Tokyo (JP); SONY PICTURES TECHNOLOGIES INC, Culver City, CA (US)

( * ) Notice: Subject to any disclaimer, the term of this patent is extended or adjusted under 35 U.S.C. 154(b) by 778 days.

(21) Appl. No.: 13/718,553

(22) Filed: Dec. 18, 2012

(65) Prior Publication Data

US 2013/0232398 A1  Sep. 5, 2013

Related U.S. Application Data

(60) Provisional application No. 61/605,544, filed on Mar. 1, 2012.

(51) Int. Cl.
*G06F 17/00* (2019.01)
*G06Q 10/10* (2012.01)
*G11B 27/34* (2006.01)
*H04N 5/222* (2006.01)
*G11B 27/034* (2006.01)

(52) U.S. Cl.
CPC .............. *G06F 17/00* (2013.01); *G06Q 10/10* (2013.01); *G11B 27/34* (2013.01); *G11B 27/034* (2013.01); *H04N 5/222* (2013.01)

(58) Field of Classification Search
CPC .......... G06F 17/00; G06Q 10/10; G11B 27/34
See application file for complete search history.

(56) References Cited

U.S. PATENT DOCUMENTS

| 5,644,694 | A | 7/1997 | Appleton | |
| 8,443,284 | B2* | 5/2013 | Lindley | G06T 19/00 |
| | | | | 715/704 |
| 8,614,737 | B2* | 12/2013 | Robert | H04N 13/178 |
| | | | | 348/42 |
| 2005/0134801 | A1 | 6/2005 | Bogdanowicz et al. | |
| 2006/0064429 | A1* | 3/2006 | Yao | G06F 16/283 |

(Continued)

OTHER PUBLICATIONS

Microsoft Computer Dictionary, 2002, Microsoft Press, 5th edition, p. 340.*

*Primary Examiner* — Kavita Padmanabhan
*Assistant Examiner* — Ahmad M El-Bkaily
(74) *Attorney, Agent, or Firm* — Procopio, Cory, Hargreaves & Savitch LLP

(57) ABSTRACT

Managing assets during production of multimedia, comprising: creating at least one scouting image; creating a metadata including information needed to import the at least one scouting image as a shot; and generating a script including commands needed to recreate the shot in its current state, and storing camera and character attributes. Keywords include asset management and scouting images.

15 Claims, 4 Drawing Sheets

(56) References Cited

U.S. PATENT DOCUMENTS

| | | | |
|---|---|---|---|
| 2007/0146360 A1* | 6/2007 | Clatworthy | G06T 15/20 345/419 |
| 2008/0300053 A1 | 12/2008 | Muller | |
| 2009/0144629 A1* | 6/2009 | Ferlitsch | H04L 67/04 715/736 |
| 2009/0196570 A1* | 8/2009 | Dudas et al. | 386/52 |
| 2009/0317061 A1* | 12/2009 | Jung et al. | 386/95 |
| 2010/0083077 A1* | 4/2010 | Paulsen et al. | 715/202 |
| 2010/0153520 A1* | 6/2010 | Daun et al. | 709/218 |
| 2010/0225648 A1* | 9/2010 | Katsambas et al. | 345/427 |
| 2010/0331086 A1* | 12/2010 | Cuddeback | 463/31 |
| 2011/0080410 A1 | 4/2011 | Lee et al. | |
| 2011/0102424 A1* | 5/2011 | Hibbert | G06T 11/60 345/419 |
| 2012/0221522 A1* | 8/2012 | Allman et al. | 707/624 |
| 2013/0173720 A1* | 7/2013 | Vasudev | H04L 12/5825 709/206 |
| 2013/0182225 A1* | 7/2013 | Stout | G03B 15/10 352/48 |

* cited by examiner

ASSET MANAGEMENT DURING PRODUCTION OF MEDIA

CROSS-REFERENCE TO RELATED APPLICATIONS

This application claims the benefit of priority under 35 U.S.C. § 119(e) of U.S. Provisional Patent Application No. 61/605,544, filed Mar. 1, 2012, entitled "Using Scouting Images During Storyboarding." The disclosure of the above-referenced application is incorporated herein by reference.

BACKGROUND

Field of the Invention

The present invention relates to managing assets, and more specifically, to managing assets during production of multimedia.

Background

In the process of making a movie, a storyboard is a pre-production process that is used to visualize scenes in detail. The storyboard expresses an image to be delivered as an illustration according to a sequence, illustrates a motion of camera and/or subject for each scene by visualizing the image to be presented to an audience and a customer. For example, the storyboarding process involves many panels of images drawn by a story artist, and presented in order for the purpose of visualizing sections of a motion picture prior to production. Typically, a completed storyboard includes the information that all staffs, such as a producer, a director, and an art director may use to understand how to construct the corresponding story.

SUMMARY

The present invention provides for managing assets using scouting images during storyboarding in content production.

In one implementation, a method of managing assets during production of multimedia is disclosed. The method includes: creating at least one scouting image; creating a metadata including information needed to import the at least one scouting image as a shot; and generating a script including commands needed to recreate the shot in its current state, and storing camera and character attributes.

In another implementation, a system for managing assets is disclosed. The system includes: a data generator configured to receive at least one scouting image created by a scouting artist, and generate metadata, and a custom script relating to the at least one scouting image, wherein the metadata includes information needed to import the at least one scouting image as a shot, and wherein the custom script include commands needed to recreate the shot in its current state; and an integration tool configured to receive and manage the at least one scouting image, the metadata, and the custom script to enable a story artist to manipulate the at least scouting image.

In yet another implementation, a non-transitory storage medium storing a computer program to manage assets during production of multimedia is disclosed. The computer program includes executable instructions that cause a computer to: generate at least one scouting image; generate a metadata including information needed to import the at least one scouting image as a shot; and generate a script including commands needed to recreate the shot in its current state, and store camera and character attributes.

Other features and advantages of the present invention will become more readily apparent to those of ordinary skill in the art after reviewing the following detailed description and accompanying drawings.

DETAILED DESCRIPTION

Figure 1:
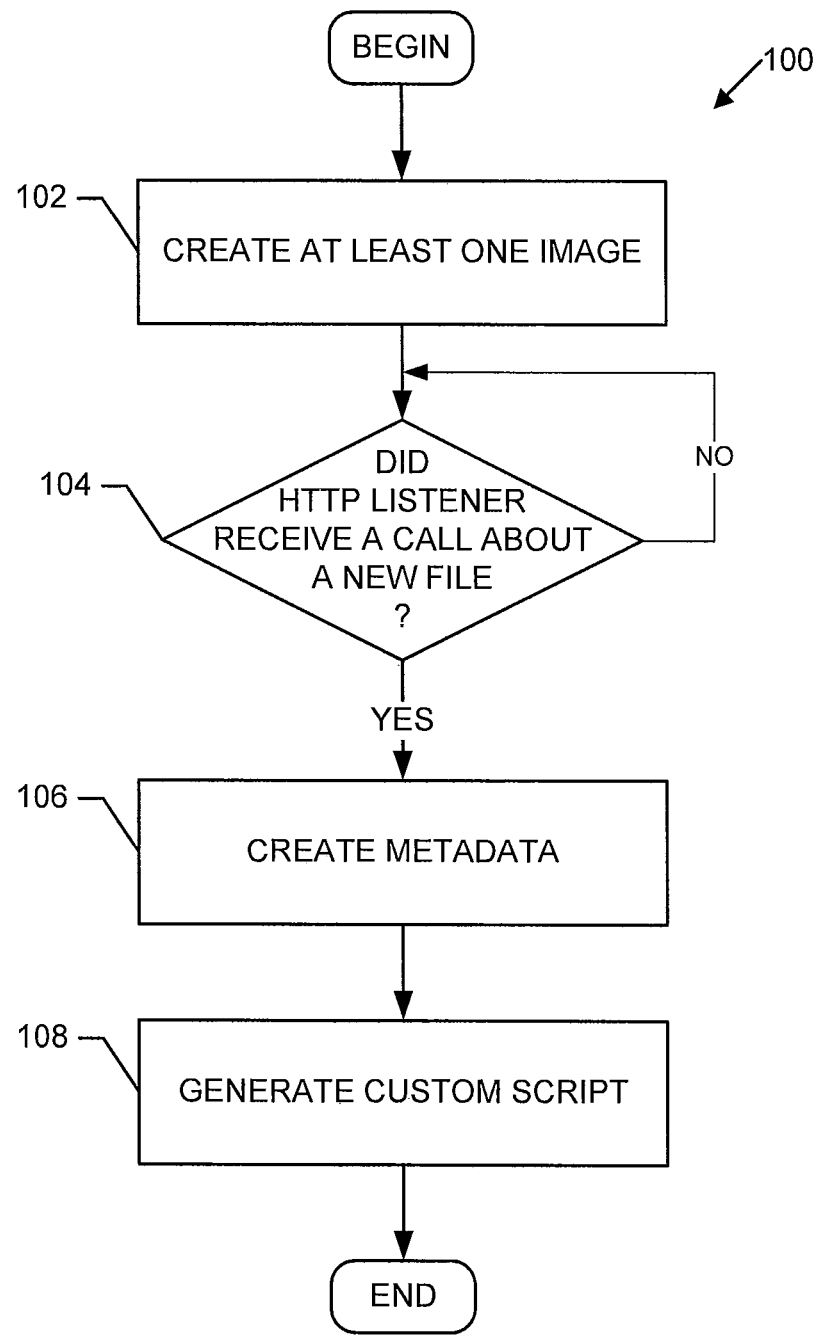
FIG. 1 is a flowchart illustrating an asset management process in accordance with one implementation of the present invention.

Certain implementations as disclosed herein provide an asset management process and system for using scouting images during storyboarding in content production. In one implementation, the system automatically organizes both storyboards and scouting images within the same application. The system also maintains metadata along with the scouting images which makes it possible to reconstruct the original 3-D environment and camera positions. After reading this description it will become apparent how to implement the invention in various implementations and applications. Although various implementations of the present invention will be described herein, it is understood that these implementations are presented by way of example only, and not limitation. As such, this detailed description of various implementations should not be construed to limit the scope or breadth of the present invention.

During the conceptual phase of a movie, an artist may use a 3-D application like Maya to select camera positions in 3-D environments and to create complex 3-D setups. This process is referred to as scouting. By incorporating scouting images into storyboards, a more accurate representation of the final shot can be achieved. However, collaboration between story artists and scouting artists introduces various organizational problems. One is that these artists use different tools to generate and manage images. The other issue is that in order to maintain the original 3-D environments and camera information, many files have to be stored and an association between each storyboard image and the original scouting file has to be maintained.

In one implementation, an asset management process and system includes an integration tool that integrates the work of the story artists and the scouting artists. The tool allows integration of a 3-D setup/environment generation process and a sketch/panel drawing process. Thus, the integration tool enables the collaboration of the story artists and the scouting artists easier by automatically organizing both storyboards and scouting images within the same application. The tool also maintains metadata along with the scouting images which makes it possible to reconstruct the original 3-D environment and camera position.

In one particular implementation, the metadata maintained with the scouting images includes a path to a custom script using an http listener. For example, when the integration tool's listener receives a call about a new file, the tool creates a markup language file (e.g., Extensible Markup Language (XML) file) which includes information needed to import the scouting image or sequence of images as a shot. The markup language file also includes a path to the custom script that can recreate the computer graphics (CG) shot in its current state. The custom script also stores the camera and character attributes. When the CG shot is created, the path to the shot is stored as metadata saved along with the shot. The metadata is maintained even when new versions of the shot are created. The user can access the script path through any versions of that shot. Thus, the user can execute the script in the integration tool, where the original shot can be recreated. The scouting images included in the recreated shot can be manipulated or used as reference for the generation of new images by the story artists. Further, the original 3-D shot can be recreated even after the images have been altered by the story artists.

FIG. 1 is a flowchart illustrating an asset management process 100 in accordance with one implementation of the present invention. Although the asset management process, in the illustrated implementation, is used to manage, develop and/or analyze a story in motion picture, this technique can be modified to be used to develop and/or analyze a story in other areas, such as in computer games, commercials, TV shows, music videos, theme park rides, and in forensic visualization.

In the illustrated implementation of FIG. 1, the asset management process 100 includes creating at least one image, at box 102. In one implementation, the image includes at least one scouting image, wherein the at least one scouting image can be still images or animated images (i.e., an animated shot) of 2-D or 3-D. In a further implementation, multiple still images can be used to create an animated shot by interpolating the positions stored with each of the still images. A check is made, at box 104, to determine whether an http listener received a call about a new file. If it is determined, at box 104, that the call about a new file was received, metadata is created, at box 106, which includes information needed to import the scouting image or sequence of images as a shot. In one implementation, the metadata is a markup language file such as an Extensible Markup Language (XML) file. In another implementation, the metadata is any annotated file which includes information needed to import the scouting image or sequence of images as a shot. A custom script is then generated, at box 108, wherein the custom script includes commands to recreate the computer graphics (CG) shot in its current state. The custom script also stores the camera and character attributes. Further, as described above, when the CG shot is created, the path to the shot is stored as metadata saved along with the shot. The metadata is maintained even when new versions of the shot are created. The user can access the script path through any versions of that shot. Thus, the user can execute the script in the integration tool, where the original shot can be recreated. The scouting images included in the recreated shot can be manipulated or used as reference for the generation of new images by the story artists. Further, the original 3-D shot can be recreated even after the images have been altered by the story artists.

Figure 2:
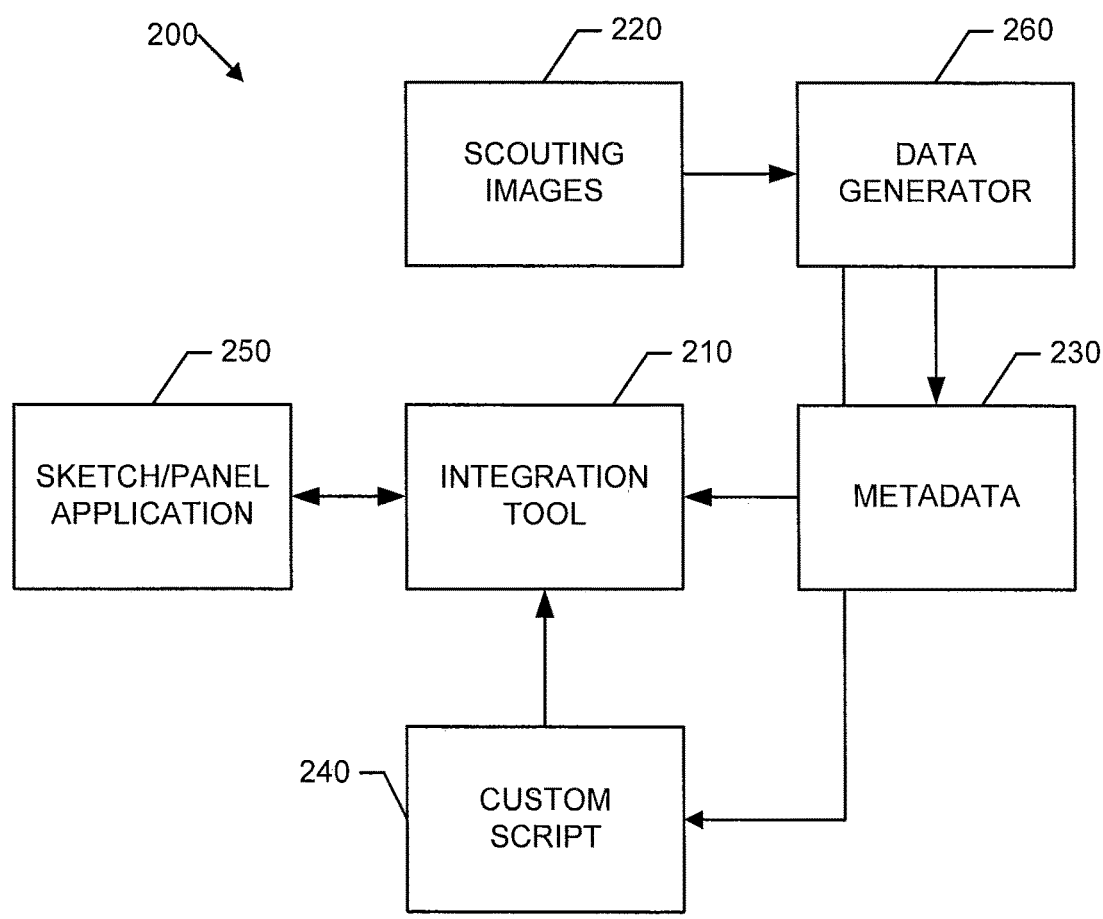
FIG. 2 is a block diagram of an asset management system in accordance with one implementation of the present invention.

FIG. 2 is a block diagram of an asset management system 200 in accordance with one implementation of the present invention. In the illustrated implementation, the asset management system 200 includes a data generator 260 which receives at least one scouting image 220, and generates metadata 230, and a custom script 240 relating to the at least one scouting image 220. The metadata includes information needed to import the scouting image or sequence of images as a shot. The custom script 240 includes the necessary commands to recreate the computer graphics (CG) shot in its current state store the camera and character attributes. The asset management system 200 also includes an integration tool 210 that integrates the work of story artists and scouting artists by communicating with a sketch/panel application 250. The tool 210 allows integration of a 3-D setup/environment generation process, which generated the at least one scouting image 220, metadata 230, and a custom script 240, and a sketch/panel drawing process managed by the sketch/panel application 250. Thus, the integration tool 210 enables the collaboration of the story artists and the scouting artists easier by automatically organizing both storyboards and scouting images within the same application. The tool 210 also maintains the metadata 230 along with the scouting images 220 which makes it possible to reconstruct the original 3-D environment and camera position.

Figure 3:
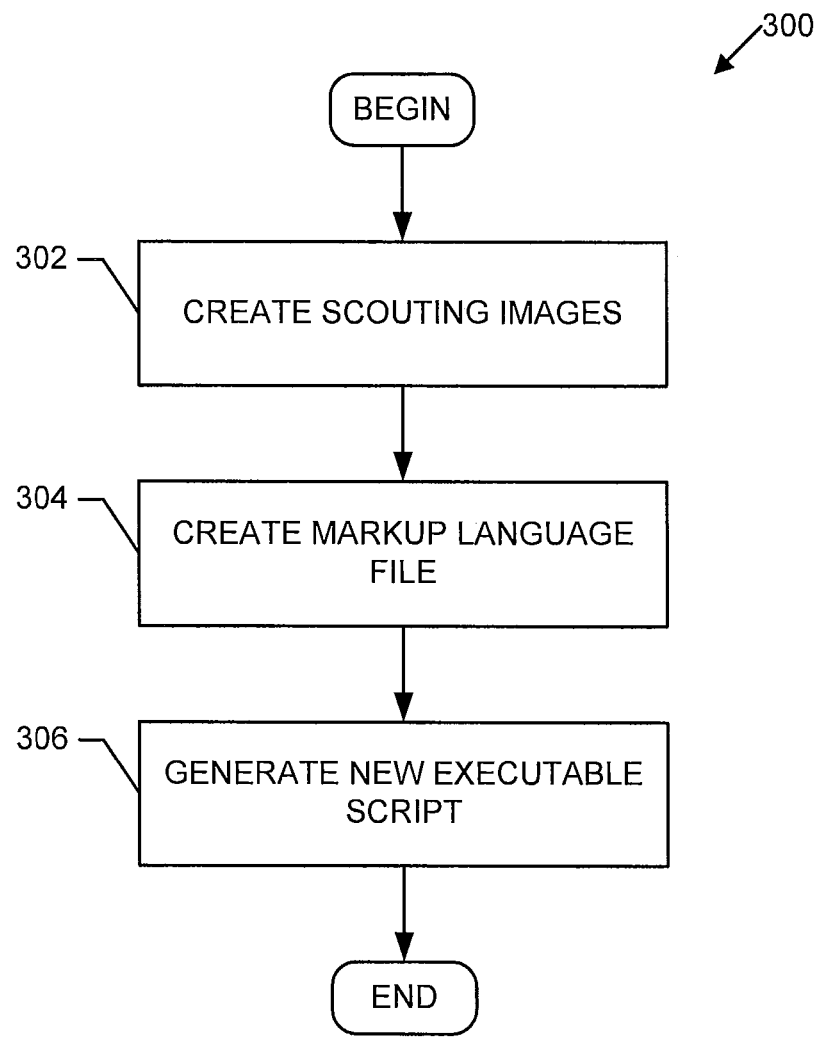
FIG. 3 is a flowchart illustrating an alternative implementation of an asset management process.

FIG. 3 is a flowchart illustrating an alternative implementation of an asset management process 300. In the illustrated implementation of FIG. 3, the asset management process 300 includes creating scouting images, at box 302. In one implementation, the scouting images are still images. In another implementation, the scouting images are animated images (i.e., an animated shot). In a further implementation, multiple still images can be used to create an animated shot by interpolating the positions stored with each of the still images. A markup language file, which includes information needed to import the scouting images as a shot, is created, at box 304. In one implementation, the markup language file is an Extensible Markup Language (XML) file. A new executable script is then generated, at box 306, wherein the executable script includes the necessary commands to recreate the computer graphics (CG) shot in its current state. The executable script also stores the camera and character attributes.

Figure 4A:
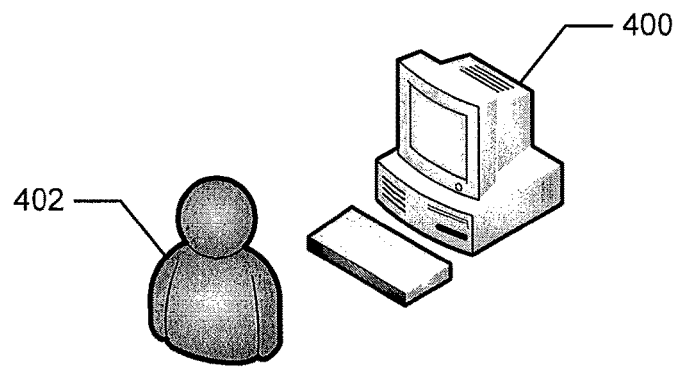
FIG. 4A illustrates a representation of a computer system and a user.

FIG. 4A illustrates a representation of a computer system 400 and a user 402. The user 402 uses the computer system 400 to perform various operations described with respect to FIGS. 1 and 3. Thus, the computer system 400 includes an integration tool 490.

Figure 4B:
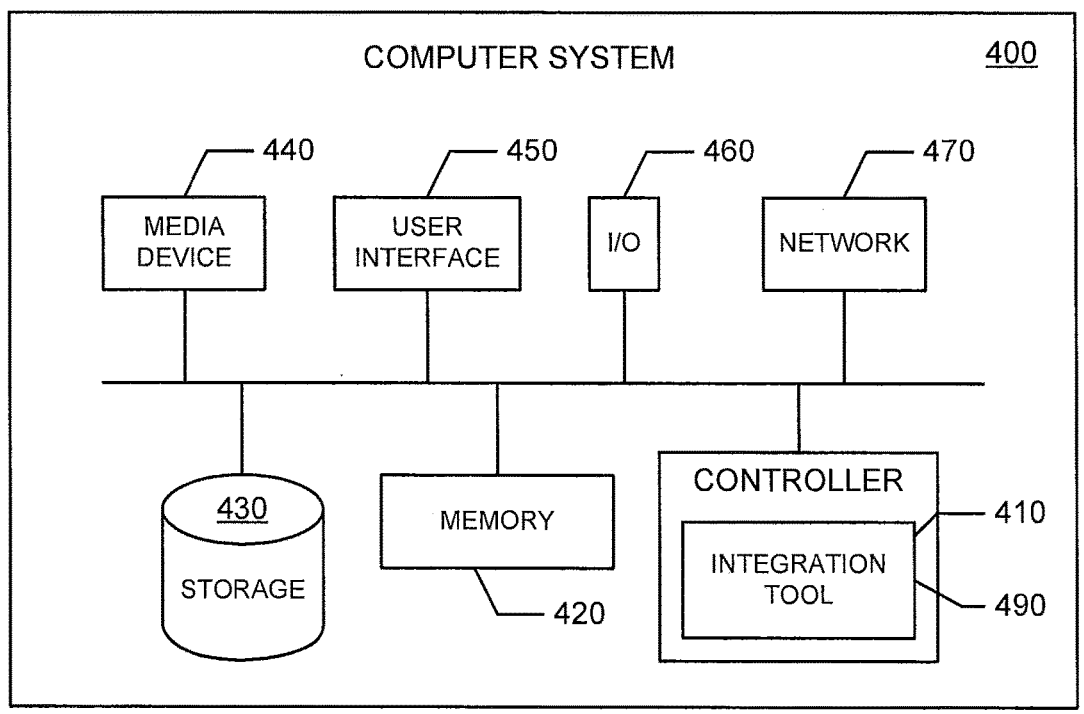
FIG. 4B is a functional block diagram illustrating the computer system hosting the integration tool.

FIG. 4B is a functional block diagram illustrating the computer system 400 hosting the integration tool 490. The controller 410 is a programmable processor and controls the operation of the computer system 400 and its components. The controller 410 loads instructions (e.g., in the form of a computer program) from the memory 420 or an embedded controller memory (not shown) and executes these instructions to control the system. In its execution, the controller 410 provides the integration tool 490 as a software system. Alternatively, this service can be implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Non-transitory storage 430 stores data for use by other components of the computer system 400, such as for storing data used by the integration tool 490. In one implementation, storage 430 is a hard disk drive.

The media device 440 receives removable media and reads and/or writes data to the inserted media. In one implementation, for example, the media device 440 is an optical disc drive.

The user interface 450 includes components for accepting user input from the user 402 and presenting information to the user 402. In one implementation, the user interface 450 includes a keyboard, a mouse, audio speakers, and a display. The controller 410 uses input from the user 402 to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

In summary, the features provided in the above-described implementations can include, but are not limited to, one or more of the following items: (1) Scouting images are tracked just as storyboards are tracked; (2) Metadata contained within the scouted images makes the recreation of the 3-D shots possible.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Accordingly, additional implementations and variations are also within the scope of the invention. For example, the system can be applied to content other than movies or television, such as game software. Further, it is to be understood that the description and drawings presented herein are representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

The invention claimed is:

1. A method of managing assets including at least one scouting image during a storyboarding process in production of a motion picture, the method comprising:
   generating metadata corresponding to the at least one scouting image, the metadata including a path to a script including commands needed to reconstruct a 3-D environment and camera positions of the at least one scouting image;
   importing the at least one scouting image from the 3-D environment for the storyboarding process;
   incorporating the least one scouting image into the storyboarding process to generate a plurality of storyboard images by organizing the at least one scouting image and the plurality of storyboard images into a single application, wherein the single application is used to generate complex 3-D setups and reconstruction of the camera positions within the 3-D environment; and
   manipulating the at least one scouting image as a reference using the script and the camera positions within the 3-D environment to generate the plurality of storyboard images.

2. The method of claim 1, wherein the multimedia comprises a computer game.

3. The method of claim 1, wherein the at least one scouting image comprises at least one animated image.

4. The method of claim 1, wherein the at least one scouting image comprises at least one 3-D still image.

5. The method of claim 4, wherein the at least one 3-D still image is used to create an animated shot having a plurality of animated images by interpolating the positions stored with each of the at least one 3-D still image.

6. The method of claim 1, wherein the metadata is a markup language.

7. The method of claim 6, wherein the markup language is an extensible markup language (XML).

8. The method of claim 1, further comprising
   importing the at least one scouting image as a shot, wherein the shot is a computer graphics (CG) shot.

9. The method of claim 8, wherein the metadata includes a path to the CG shot.

10. The method of claim 1, further comprising
    importing the at least one scouting image as a shot and recreating the shot in its current state using the script.

11. The method of claim 10, further comprising:
    recreating the shot as a new version of the shot; and
    reusing the metadata corresponding to the shot as the metadata for the new version of the shot.

12. A non-transitory storage medium storing a computer program to manage assets including at least one scouting image during a storyboarding process in production of a motion picture, the computer program comprising executable instructions that cause a computer to:
    generate metadata corresponding to the at least one scouting image, the metadata including a path to a script including commands needed to reconstruct a 3-D environment and camera positions of the at least one scouting image;
    import the at least one scouting image from the 3-D environment for the storyboarding process;
    incorporate the least one scouting image into the storyboarding process to generate a plurality of storyboards by organizing the at least one scouting image and the plurality of storyboards into a single application, wherein the single application is used to generate complex 3-D setups and reconstruction of the camera positions within the 3-D environment; and
    manipulating the at least one scouting image as a reference using the script and the camera positions within the 3-D environment to generate the plurality of storyboard images.

13. The non-transitory storage medium of claim 12, wherein the metadata is a markup language.

14. The non-transitory storage medium of claim 12, further comprising executable instructions that cause the computer to
    import the at least one scouting image as a shot and recreate the shot in its current state using the script.

15. The non-transitory storage medium of claim 14, further comprising executable instructions that cause the computer to:
    recreate the shot as a new version of the shot; and use the metadata corresponding to the shot as the metadata for the new version of the shot.

\* \* \* \* \*